P. CATUCCI.
PHONOGRAPH.
APPLICATION FILED FEB. 17, 1913.

1,067,405. Patented July 15, 1913.

4 SHEETS—SHEET 1.

Witnesses:

Pliny Catucci Inventor
By Attorneys

P. CATUCCI.
PHONOGRAPH.
APPLICATION FILED FEB. 17, 1913.

1,067,405.

Patented July 15, 1913.

4 SHEETS—SHEET 2.

Witnesses:
F. L. Green
W. N. Kaltzinger

Pliny Catucci Inventor
By Louis W. Sanders Attorney

P. CATUCCI.
PHONOGRAPH.
APPLICATION FILED FEB. 17, 1913.

1,067,405.

Patented July 15, 1913.
4 SHEETS—SHEET 3.

Witnesses:
P. L. Green.
W. B. Waltzinger.

Pliny Catucci Inventor
By Louis M. Sanders Attorneys

P. CATUCCI.
PHONOGRAPH.
APPLICATION FILED FEB. 17, 1913.

1,067,405.

Patented July 15, 1913.

4 SHEETS—SHEET 4.

Witnesses:

Pliny Catucci Inventor
By Louis M. Sanders Attorney

UNITED STATES PATENT OFFICE.

PLINY CATUCCI, OF NEWARK, NEW JERSEY, ASSIGNOR TO A. F. MEISSELBACH & BROTHER, A CORPORATION OF NEW JERSEY.

PHONOGRAPH.

1,067,405.      Specification of Letters Patent.      Patented July 15, 1913.

Original application filed May 15, 1912, Serial No. 697,426. Divided and this application filed February 17, 1913. Serial No. 748,767.

*To all whom it may concern:*

Be it known that I, PLINY CATUCCI, a citizen of the United States, residing in the city of Newark, county of Essex, and State of New Jersey, have invented certain new and useful Improvements in Phonographs, of which the following is a specification.

This application is a division of my prior application, Ser. No. 697,426, filed May 15, 1912.

The prime object of my invention is to so construct the case of a phonograph as to provide in itself sound amplifying means without special adaptation of the sound conductor or so called horn.

In phonographs of the disk type, as at the present day constructed, it is the practice either to lead a sound conductor or tube from the reproducer to an external sound amplifying horn or lead such tube into, and thence construct within the case a more or less distorted funnel shaped sound amplifier, the degree of distortion depending of course upon the space within this case after the motor and other operating parts have been provided for. After a series of exhaustive experiments, I have found that the case itself, without material modification, may be utilized as a sound amplifying device so that the distorted amplifier, above referred to, may be wholly dispensed with, and a simple deflector of metal, wood, fiber, or other suitable material may be located adjacent to the exit of the sound waves from the conductor, when substantially the same results and even in some cases better results have been obtained than by the old form of structure.

In carrying out my invention, I make use of the structure illustrated in the accompanying drawings, and described in detail in the following specification.

Figure 1:
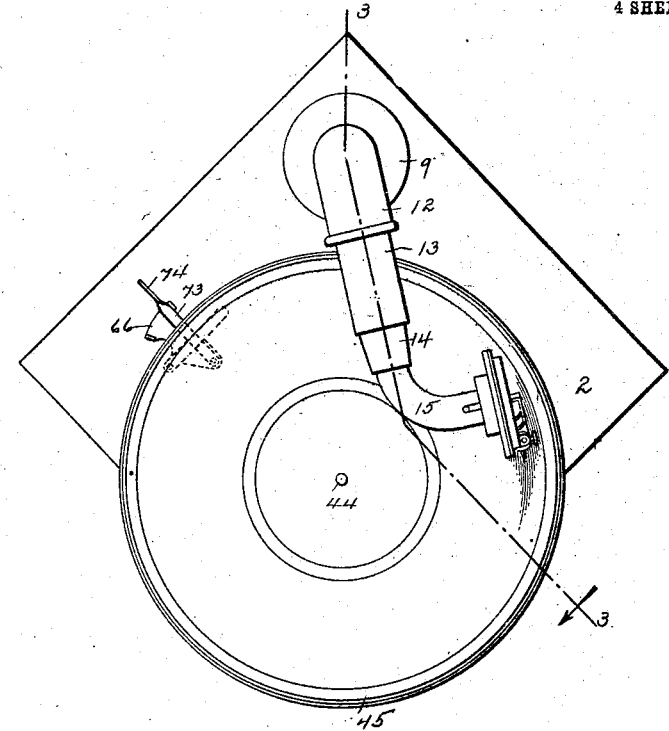
Figure 2:
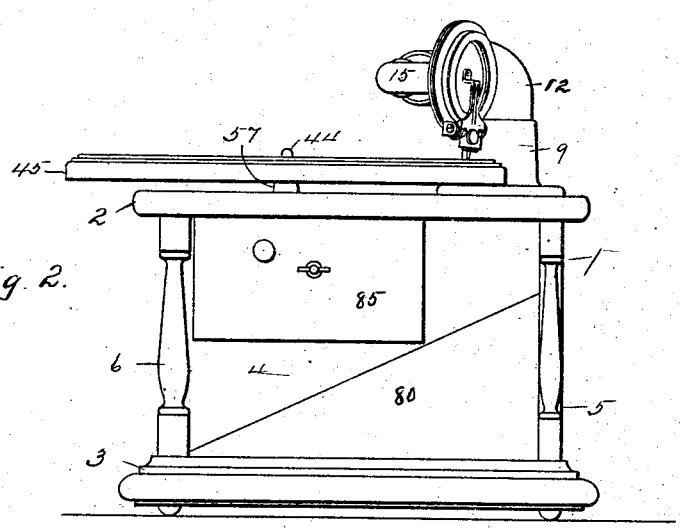
Figure 3:
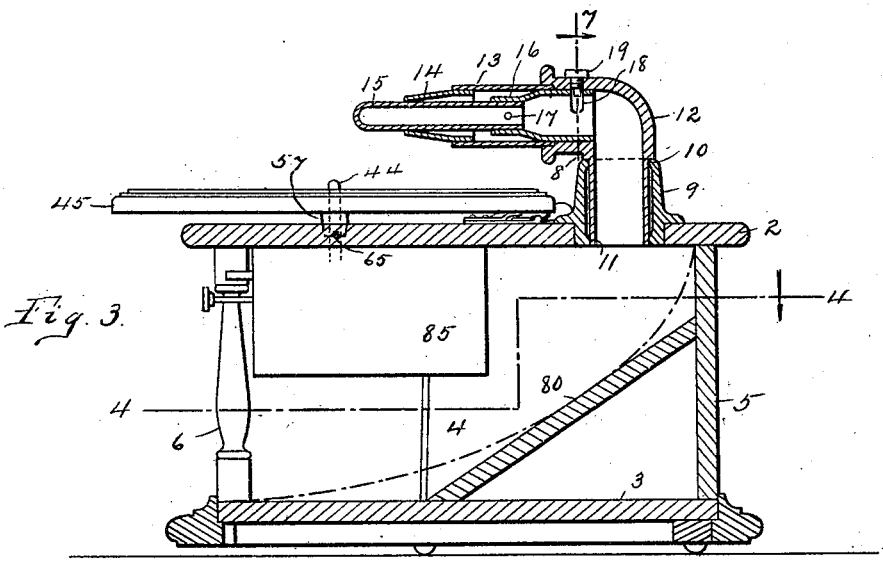
Figure 4:
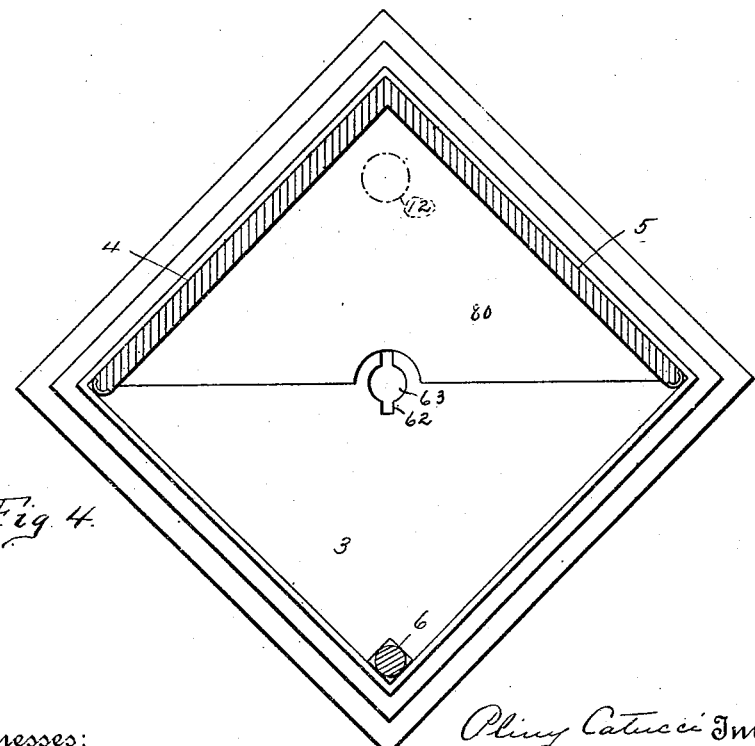
Figure 7:
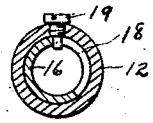
Figure 8:
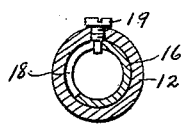
Figure 5:
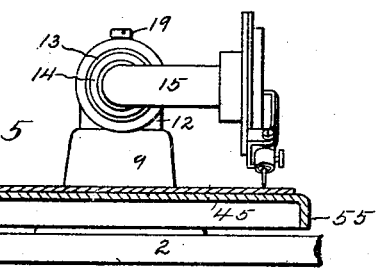
Figure 6:
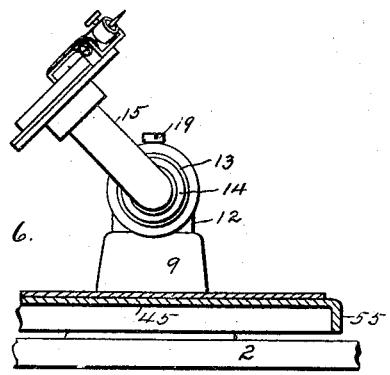
Figure 9:
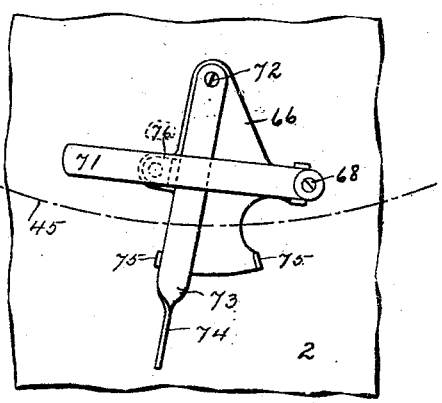
Figure 10:
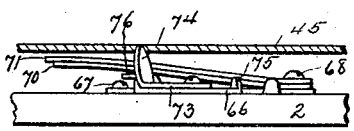
Figure 11:
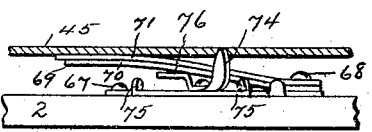
Figure 12:
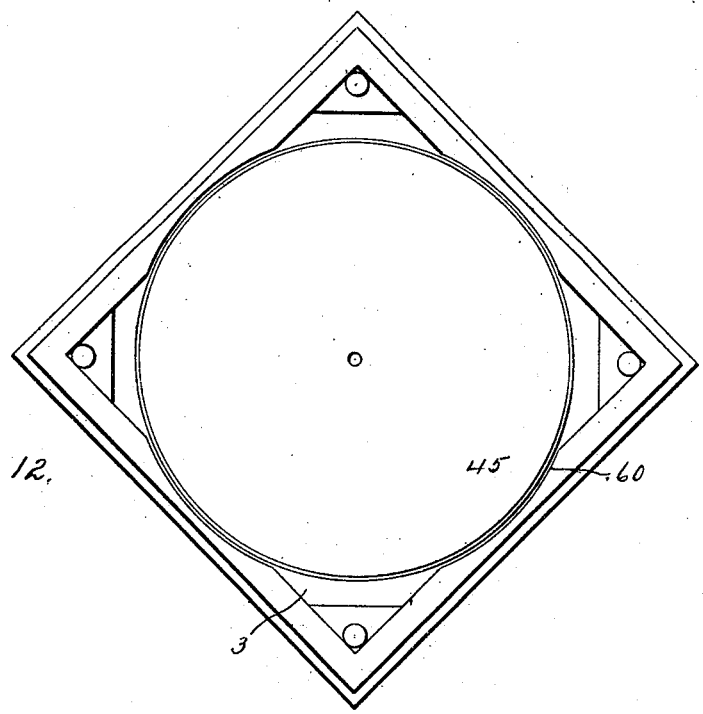
Figure 13:
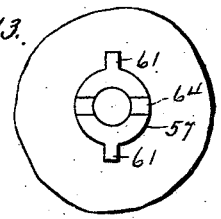
Figure 14:
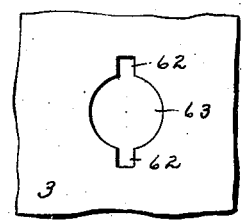
Figure 15:
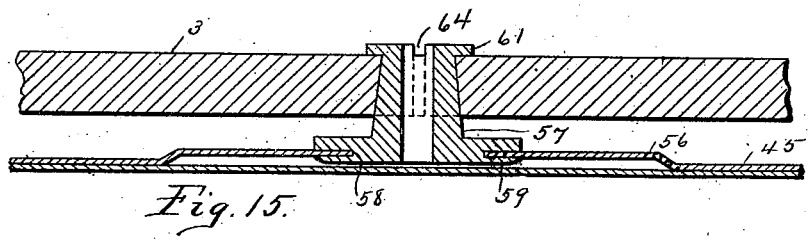

Figure 1 is a plan view of the complete phonograph. Fig. 2 is a side elevation of the same. Fig. 3 is a vertical section on line 3—3 of Fig. 1. Fig. 4 is a horizontal section through line 4—4 of Fig. 3. Fig. 5 is an end view of the sound box and conductor in playing position. Fig. 6 is a similar section view but with the sound box reversed or elevated for the purpose of replacing the stylus needle. Figs. 7 and 8 are vertical cross sections on line 7, 8 of Fig. 3, showing the two positions of the sound box tube. Fig. 9 is a plan view of the brake mechanism. Fig. 10 is a vertical section of the brake mechanism with the brake as "off." Fig. 11 is a similar view with the brake as "on." Fig. 12 is a bottom plan view of the phonograph case showing the recessed receptacle in the bottom of the case for storing the turn table or tablet support, when not in use. Fig. 13 is an under plan view of the thimble or sleeve by which the record tablet support or table is secured to the driving shaft. Fig. 14 illustrates an aperture in the bottom of the case showing the diametrical slots to receive corresponding lugs or tangs upon the tablet supporting sleeve. Fig. 15 is a sectional view showing the tablet support or table in the stored position in the bottom of the case.

Similar reference numerals refer to like parts throughout the specifications and drawings.

The case 1 of the phonograph is of the usual rectangular form and is illustrated in the drawings as having the cover 2, bottom 3, and two sides 4 and 5. I also provide a single supporting post 6, as shown in Fig. 4, for the purpose of supporting the overhanging angle of the cover and connecting the same to the bottom, so as to render the case rigid. The two remaining sides of the case may be left open.

The sound box and sound conveyer tube may be of any usual or preferred type, as for example, such as are illustrated in my prior patent applications, Ser. Nos. 693,352 and 693,353, or the conveyer tube itself may be constructed as illustrated in Fig. 3 and several of the other figures. In this case, I provide the tubular standard 9 secured to the cover of the case in any convenient manner, but preferably in one corner of the cover as illustrated in Figs. 1 and 3. The interior of this standard is provided with the upper and lower bearings 10 and 11 for the vertical portion of the elbow 12, so that said elbow may freely revolve or oscillate within said bearings. Projecting forward from the elbow 12 is the supporting tube 13 from the outer end of which projects the tapering bearing section 14. Extending within the horizontal parts, as thus described, is the sound box tube section 15, to the inner end of which is coupled the bearing section 16, the diameter of the latter being such as to nicely fit the horizontal section of the elbow, 12. The sections 15 and 16 may be secured together in any convenient manner so as to be substantially rigid, as for example, by means of the rivet 17. The inner section 16 is provided with a circumferential slot 18 into which extends the reduced end of the screw 19, which latter is screw threaded into the horizontal section of the elbow 12, the purpose of which is to axially limit the oscillations of the tube section 15 and 16.

The parts of the motor are the same in general as usually found in phonograph motors, and the details thereof are omitted.

The record tablet support 45, is detachably mounted upon the upper end of shaft 44, which latter is driven by the motor and projects through the cover 2. This support consists simply of a disk of metal pressed to shape with the overhanging flange 55, but depressed central portion 56 in the center of which is mounted the thimble or sleeve 57, as shown in Fig. 15. This thimble or sleeve may be secured to the center in any suitable or preferred manner, but I have found it convenient to provide a shoulder 58 upon the same and then rivet or spin the extended portion of the thimble over upon the flat plate, as at 59.

In Fig. 12 I have shown the bottom of the case as provided with a recess 60 to receive the record tablet support 45 for packing and shipping purposes, for it will be seen from a reference to Fig. 1, that the tablet support overhangs the case for a considerable distance. When in use this is not objectionable, but for shipment or storage, it only adds to the bulk of the package necessary to contain the same, and one of the objects of the invention is to reduce the size of the case to the smallest possible limit and thereby reduce the cost of the shipping or packing case, which must be used for packing or shipping the same. The tangs or lugs 61 projecting laterally from the end of the sleeve or thimble 57 are designed to pass through the diametrical slots 62 of the aperture 63 in the bottom of the case, and when the tablet support is given a partial turn, these lugs 61 will overhang the solid body of the case bottom, as shown in Fig. 15. Thus the tablet support 45 may be safely secured in the bottom of the case. I may also provide the lateral slot 64 in the sleeve or thimble 57, so that when the tablet support is mounted upon the shaft 44, said slot will take over the diametrical pin 65, which latter is fixed at a suitable point in the shaft 44. This pin serves the double purpose of limiting the distance to which the record tablet support will slide down upon the shaft 44 and also as a means for driving the tablet support when in position. As a means for quickly stopping the motor and consequently the rotation of the tablet support, I locate a brake beneath the outer margin of the tablet support, as clearly shown in Fig. 9. This brake structure consists of a plate 66 cut substantially to the shape shown in Fig. 9 and held in position by means of the screws 67 and 68. The screw 68 serves the double purpose of fastening the plate 66 and also securing a spring brake 69 to the upper face of the cover in position for contact with the under face of the record tablet support 45. This brake 69 consists of a strip of spring metal 70 and a strip of leather or other good friction material 71 superposed upon the spring brake piece 70. Pivoted at 72, upon the plate 66 is the brake lever 73, the latter extending outwardly beyond the periphery of the tablet support 45 and having a twist as at 74 in the same to provide convenient means for hand manipulation. I also provide a pair of tangs 75, upon the outer end of the plate 66, bending such tangs at right angles to the plane of the plate to form stops to limit the movement of the lever 73. This lever has at a point midway of its length, a lateral upturned cam projection 76 for contact with the under side of the inclined portion of the brake spring 70. The normal bias of the spring 70 is such as to hold it and the brake material 71, away from the under side of the tablet support 45. With the brake lever thrown in the position illustrated in Figs. 9 and 10, the brake spring and its brake leather 71 are shown out of contact with the tablet support 45. When, however, the brake lever 73 is swung to the right as represented in Fig. 11, the offset cam projection 76 will engage the under inclined face of the brake spring 70 and thus press it upwardly against the under side of the record tablet support 45, and the friction of the parts will cause a complete stoppage of the rotation of the tablet support.

From the description of the sound conductor tube, above referred to, in connection with Fig. 3 of the drawings, it will be noted that the tube proper terminates at the lower side of the cover 2 of the case. Thus the sound waves are projected into the open space within the case and are not as has hitherto been the case conducted within confined walls to the open atmosphere. The projection of the sound waves into the open case now requires some means by which they may be deflected into the open atmosphere.

I obtain very admirable sound effects from using a simple plane deflector 80, extending the same into the angle between the two closed sides of the case, as illustrated in Figs 3 and 4 with its upper face lying in a plane tangent to the theoretically correct conic section curve. This may be a piece of plane wood properly shaped to fit the corner, or it may be constructed of fiber, metal, rubber, papier mâché, or any suitable material either with or without inherent resonant qualities. I regard this latter new improvement as very radical and desire to cover the same in the broadest possible manner.

It might be thought that the location of the motor within the path of the sound waves from the reflector amplifier, would interfere with the clearness of the same, or that the slight noise or rattle of the same would interfere with the sound waves coming from the record. This however, is not the case, and in practice there seems to be no interference whatsoever even though the motor is located in substantially the direct line of the sound. In order, however, to protect the motor from the access to dust and dirt and the like, which may be floating in the atmosphere, I may provide a cover 85 for the same such cover completely inclosing the motor against the under side of the cover of the case.

I claim:

1. In a phonograph, a rectangular supporting case having a top, a bottom and two closed sides, two of its adjacent sides being open and a motor within said case, a record tablet support driven by said motor, a sound conveyer tube pivotally mounted upon one corner of the case and communicating with the interior thereof, at a point adjacent to its closed sides, an inclined triangular sound reflector within said case and extending into the corner thereof between the closed sides and adjacent to the inner end of said conveyer tube.

2. In a phonograph, the combination of a rectangular case closed at its top, bottom and two adjacent sides and having its two remaining sides open, means for conveying sound through said top to the interior of the case at a point adjacent to the angle between said adjacent closed sides, and a triangular sound reflector within said case and extending into the angle of said closed sides and beneath the point where the sound waves enter.

3. An amplifier and reflector for sound producing devices, comprising a rectangular case open upon two adjacent sides, and closed upon its remaining sides, means for conveying sound waves to the interior of said case at a point adjacent to the angle between the closed sides of said case and an inclined triangular reflector extending into the angle between said adjacent closed sides.

4. An amplifier and reflector for sound producing devices, comprising a rectangular case open upon two of its adjacent sides and closed upon its remaining sides, an external sound tube communicating with the interior of said case at a point adjacent to the angle between the two closed sides thereof, and a triangular sound reflector extending into said angle opposite the open end of said sound tube.

5. In a phonograph, a combined supporting and sound amplifying case, having its top, bottom and two adjacent sides closed and its remaining sides open, and an inclined triangular sound reflector extending into the angle between the closed sides.

6. In a phonograph, the combination of a sound producing means with amplifying means comprising a rectangular case, closed at its top, bottom and two adjacent sides and having the remaining two sides open, and an inclined triangular reflector extending into the angle between the two closed sides.

7. In a phonograph, a case having an open recess with a central aperture in its bottom, and a record tablet support having means thereon for engagement with the walls of said aperture to hold said tablet support in said recess.

8. In a phonograph, a phonograph case having an open recess in the bottom thereof, having attaching means therein, a detachable record tablet support, and means upon said support for securing the same to said attaching means in said recess.

In testimony whereof I have hereunto set my hand this 14th day of February, 1913.

PLINY CATUCCI.

Witnesses:
 Louis M. Sanders,
 W. B. Waltzinger.